United States Patent
Kilgour et al.

(10) Patent No.: US 10,433,217 B2
(45) Date of Patent: Oct. 1, 2019

(54) NETWORK ELEMENTS, WIRELESS COMMUNICATION SYSTEM AND METHODS THEREFOR

(71) Applicants: ip.access Limited, Cambridge (GB); Christopher Edward John Kilgour, Cambridge (GB); Nicholas Dougall Johnson, Cambridge (GB); Neil Philip Piercy, Royston (GB); James Edward Brereton Harrow, Cambridge (GB); Alan Whitehead, Macclesfield (GB); David Charles Brock, Cambridge (GB)

(72) Inventors: Christopher Edward John Kilgour, Cambridge (GB); Nicholas Dougall Johnson, Cambridge (GB); Neil Philip Piercy, Royston (GB); James Edward Brereton Harrow, Cambridge (GB); Alan Whitehead, Macclesfield (GB); David Charles Brock, Cambridge (GB)

(73) Assignee: ip.access Limited, Cambridge (GB)

( * ) Notice: Subject to any disclaimer, the term of this patent is extended or adjusted under 35 U.S.C. 154(b) by 0 days.

(21) Appl. No.: 15/119,682

(22) PCT Filed: Feb. 19, 2015

(86) PCT No.: PCT/EP2015/053473
§ 371 (c)(1),
(2) Date: Aug. 17, 2016

(87) PCT Pub. No.: WO2015/124657
PCT Pub. Date: Aug. 27, 2015

(65) Prior Publication Data
US 2017/0013518 A1    Jan. 12, 2017

(30) Foreign Application Priority Data

Feb. 20, 2014   (GB) .................................. 1403005.0

(51) Int. Cl.
*H04W 36/00* (2009.01)
*H04W 48/12* (2009.01)
(Continued)

(52) U.S. Cl.
CPC ... *H04W 36/0066* (2013.01); *H04W 36/0061* (2013.01); *H04W 48/12* (2013.01); *H04W 88/02* (2013.01); *H04W 88/08* (2013.01)

(58) Field of Classification Search
CPC ......... H04W 36/0061; H04W 36/0066; H04W 48/12; H04W 88/02; H04W 88/08;
(Continued)

(56) References Cited

U.S. PATENT DOCUMENTS

2006/0121877 A1 * 6/2006 Raghuram .............. H04W 4/22
455/404.2
2010/0316000 A1 * 12/2010 Burbidge .......... H04W 36/0022
370/328
(Continued)

FOREIGN PATENT DOCUMENTS

JP       2012525806 A    10/2012
WO    2012026086 A1    1/2012

OTHER PUBLICATIONS

Performance of CS Fallback from LTE to UMTS , Jose E. Vargas Bautista, Salil Sawhney, Mutaz Shukair, Ishwinder Singh, Vishwant/J K. Govindaraju, and Sandip Sarkar, Qualcomm Corporate Engineering.

(Continued)

*Primary Examiner* — Erica Navar
(74) *Attorney, Agent, or Firm* — Optimus Patents US, LLC (57) ABSTRACT

A method and apparatus for redirecting a wireless communication unit (113) from a LTE cell to a neighboring 3G or 2G cell for the purposes of performing a procedure which is
(Continued)

available in the 2G or 3G cell but not available in the LTE cell includes the provision of an additional LTE access point (109) within the coverage area of an LTE macrocell. The additional LTE access point (109) is arranged to capture a wireless communication unit (113) which is camped onto the LTE macrocell and redirect it to a 3G/2G cell irrespective of whether or not a better service may be provided in the 2G/3G cell. The invention has application to presence detection where collection of wireless communication units' and subscribers' IDs for such a purpose is possible in 3G and 2G cells but not in LTE cells.

18 Claims, 2 Drawing Sheets

(51) Int. Cl.
    *H04W 88/02* (2009.01)
    *H04W 88/08* (2009.01)
(58) Field of Classification Search
    CPC ......... H04W 36/0055; H04W 36/0083; H04W 48/16; H04W 76/027; H04W 24/10; H04W 36/0077; H04W 48/20; H04W 76/028; H04W 88/06; H02M 1/44; H02M 2001/0032; H02M 3/156; H02M 3/33507; H02M 3/33523

USPC .................................................. 455/436–444
See application file for complete search history.

(56) References Cited

U.S. PATENT DOCUMENTS

| | | | |
|---|---|---|---|
| 2010/0331011 A1* | 12/2010 | Vikberg | H04W 68/12 |
| | | | 455/456.1 |
| 2011/0032816 A1 | 2/2011 | Isaksson et al. | |
| 2012/0309385 A1 | 12/2012 | Nakamura et al. | |
| 2013/0225160 A1 | 8/2013 | Fujino et al. | |
| 2013/0303176 A1 | 11/2013 | Martin | |
| 2016/0057682 A1* | 2/2016 | Yang | H04W 36/24 |
| | | | 455/436 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 12).

* cited by examiner

NETWORK ELEMENTS, WIRELESS COMMUNICATION SYSTEM AND METHODS THEREFOR

FIELD OF THE INVENTION

The field of this invention relates to network elements, a wireless communication system and methods for operating a cellular communication system and has particular applicability to providing a location presence service in such a system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by Voice-over-LTE (VoLTE—a VoIP technique) or, via Circuit Switched Fallback (CSFB) by a 2G or 3G Radio Access Network (RAN) and circuit switched (CS) domain network. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN. Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (APs) with the term Home Node B (HNB, specifically for 3G) or Evolved Home Node B (HeNB, specifically for LTE) defined by 3GPP to identify femtocell Access Points. Each small-cell is supported by a single Access Point. These small cells are intended to augment the wide area macro network and support communications to multiple User Equipment devices in specific environments, for example, indoor or enterprise. Such small cells are intended to be able to be deployed "underneath" a macrocell (in a multi-layer structure, for example) in order to support communications to UEs in a restricted area such as a shopping mall, for example. An additional benefit of small cells is that they can offload traffic from the macro network, thereby freeing up valuable macro network resources). One or more Access Points are linked to a Core Network through an Access Controller. An Access Controller which links one or more HNB's to the Core Network is known as a Home Node B Gateway (HNB-GW). An HNB provides a radio access network connectivity to a user equipment (UE) using the so-called Iuh interface to a HNB-GW.

Although there are no standard criteria for the functional components of an AP, an example of a typical AP for use within a 3GPP 3G system may comprise Node-B functionality and some aspects of Radio Network Controller (RNC) functionality as specified in 3GPP TS 25.467.

A current industry model is to implement a GSMA one API on one of three places: viz. on the User Equipment (for handset applications) or on the small cell (for local applications) or on the application Gateway (for external third-party access). The GSMA one API is an application programming interface which has been developed by the GSM (Global System for Mobile Communications) Association. It is intended to be a web service interface. An application developed with one API can obtain information across network operators that support it. It is intended for operation on servers and mobile devices and the first API's to be implemented will be for messaging and location functions. Specifically, version 1 requires "location presence" capability and the ability to send and receive short message services (SMS) and multimedia messaging services (MMS) through the application Gateway using the GSMA one API.

"Presence" services in general permit an individual and equipment which he/she uses for communication to share information on the state of the individual and that equipment. Such information can include whether the individual and his communication equipment are currently able to communicate with others or are engaged on a video call, for example. "Presence" can also include information relating to the location of a user's communication equipment. A "presence server" may be provided in such instances for, on detection that a particular UE has entered a particular location, enabling applications that subscribe to a "presence" service to take some form of action. For example, location information can be very useful to retailers and advertisers who may wish to communicate with shoppers who are known to be in a certain location at a certain time, a shopping mall for example.

Some current Location Presence services are based on the use of a localised Identity Request sent by an Access Point to a UE to obtain its IMSI International Mobile Subscriber Identifier). This was originally proposed to support a form of access control. If the Access Point is prepared to offer normal telecommunications services, then the UE is allowed to register on the small cell. Alternatively, the IMSI may be captured from the so-called "Common_ID" sent by the Core network. In each case an Access Point must have a different LAC/RAC from the surrounding coverage (ie. other small cells or overlapping macrocell) in order to prompt a Registration attempt when camping on. A registration attempt may be used to prompt a location presence trigger. (See Applicant's co-pending Application GB 1209224.3). Collection of a UE's IMSI is possible in 3G and 2G networks but not in LTE networks. In LTE networks, by contrast with 2G and 3G networks, the signalling that carries the IMSI is ciphered between the UE and the core and so cannot be inspected in the RAN and used as a basis of presence services.

SUMMARY OF THE INVENTION

According to one aspect of the invention, there is provided communications apparatus comprising a first access point for providing communications in a first cell using a radio access technology (RAT), wherein the first cell has a coverage area which overlaps at least a part of a coverage area of a second cell which uses a radio access technology which is the same as that of the first cell, and at least a part of a coverage area of a third cell which uses a radio access technology which is different from that of the first and second cells, wherein the first cell has a tracking area code (TAC) which is different from a tracking area code assigned to the second cell, and wherein the first access point includes a memory for storing information relating to the third cell, and wherein the first access point is arranged to receive a request for connection from a wireless communication unit which is within the coverage area of the first cell and camped on to the second cell, and in response to receiving said request for connection, redirect the wireless communication unit to the third cell by sending to the wireless communication unit, a Radio Resource Control Connection Release message including a Radio Resource Control redirection Information Element which includes the stored information relating to the third cell.

In one embodiment, the communications apparatus includes a second access point for providing communications services in said third cell and arranged to receive a request for connection from a wireless communication unit which has been re-directed thereto by the first access point and further arranged to request from the wireless communication unit, a unique identifier relating to the wireless communication unit, to receive said unique identifier from the wireless communication unit, and to generate a presence notification message including said unique identifier and forward said presence notification message to a remote entity.

The second access point may generate a message requesting the wireless communication unit to provide its unique identifier without any assistance from a core network. The second access point may be arranged to provide services to the re-directed wireless communication unit or to reject its request for connection or re-direct it a neighbouring cell, once the unique identifier has been received. The first and second access points may be co-located or situated at different geographical locations. The first access point may be provided with a network listen device for gathering information on the third cell from broadcasts by the third cell, for storage in the memory. The unique identifier may be the IMSI of the wireless communication unit. The RAT used by the first and second cells may be LTE and the RAT used by the third cell may be 2G or 2G.

According to another aspect of the invention, there is provided a method for operating a cellular communication system, the method comprising; in a first access point which provides communications in a first cell using a radio access technology (RAT), wherein the first cell has a coverage area which overlaps at least a part of the coverage area of a second cell which uses a radio access technology which is the same as that of the first cell and at least a part of the coverage area of a third cell which uses a radio access technology which is different from that of the first and second cells, assigning a tracking area code to the first cell which is different from a tracking area code assigned to the second cell, storing information relating to the third cell, receiving a request for connection from a wireless communication unit which is within the coverage area of the first cell and camped on to the second cell, and in response to receiving said request for connection, redirecting the wireless communication unit to the third cell by sending to the wireless communication unit, a Radio Resource Control Connection Release message including a Radio Resource Control redirection Information Element which includes the stored information relating to the third cell.

Specific embodiments of the invention are set forth in the dependent claims. These and other aspects of the invention will be apparent from and elucidated with reference to the embodiments described hereinafter. Functional elements of the access points may be implemented in one or more integrated circuit devices.

The invention provides a method and apparatus for redirecting a wireless communication unit from an LTE cell to a neighbouring 3G or 2G macrocell for the purposes of performing a procedure which is available in the 2G or 3G cell but not available in the LTE cell. The invention includes the provision of an additional LTE access point within the coverage area of an LTE macrocell. The additional LTE access point may be arranged to capture a wireless communication unit which is in idle mode and registered with the LTE macrocell and redirect it to a 3G/2G cell irrespective of whether or not a better service may be provided in the 2G/3G cell. The invention has application to presence detection where collection of wireless communication units' and/or subscribers' IDs for such a purpose is possible in 3G and 2G cells but not in LTE. There could be other examples where it is desired to override the normal macro policies to steer a UE towards a localised coverage area on an alternate RAT. These examples require a localised solution that is capable of overriding normal macro LTE policy to steer an Idle UE from the LTE service layer to another RAT.

The invention may use a redirection procedure of an LTE cell to immediately redirect a captured UE to another RAT (e.g. 3G or 2G), thus overriding the normal layer behaviour. The 2G or 3G access point to which the UE has been directed, can subsequently perform a presence operation at its particular location without core network support. This would not be possible if the UE had remained attached to the LTE cell.

The invention may be used within a multimode cell (e.g. LTE+3G) or may be realised as separate components (e.g. a single LTE cell used as a Redirection Gateway to one or more 3G and/or 2G cells). The invention can provide a localised method of steering a UE from an LTE cell to a cell on another RAT that can operate alongside existing macrolayer policies. In one embodiment, for the purposes of a redirection-only procedure, the LTE cell need not be connected to the EPC, thus reducing the signalling load on the Core Network.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the examples described are merely illustrative of some embodiments and that the teachings set forth herein are applicable in a variety of alternative settings.

Figure 1:
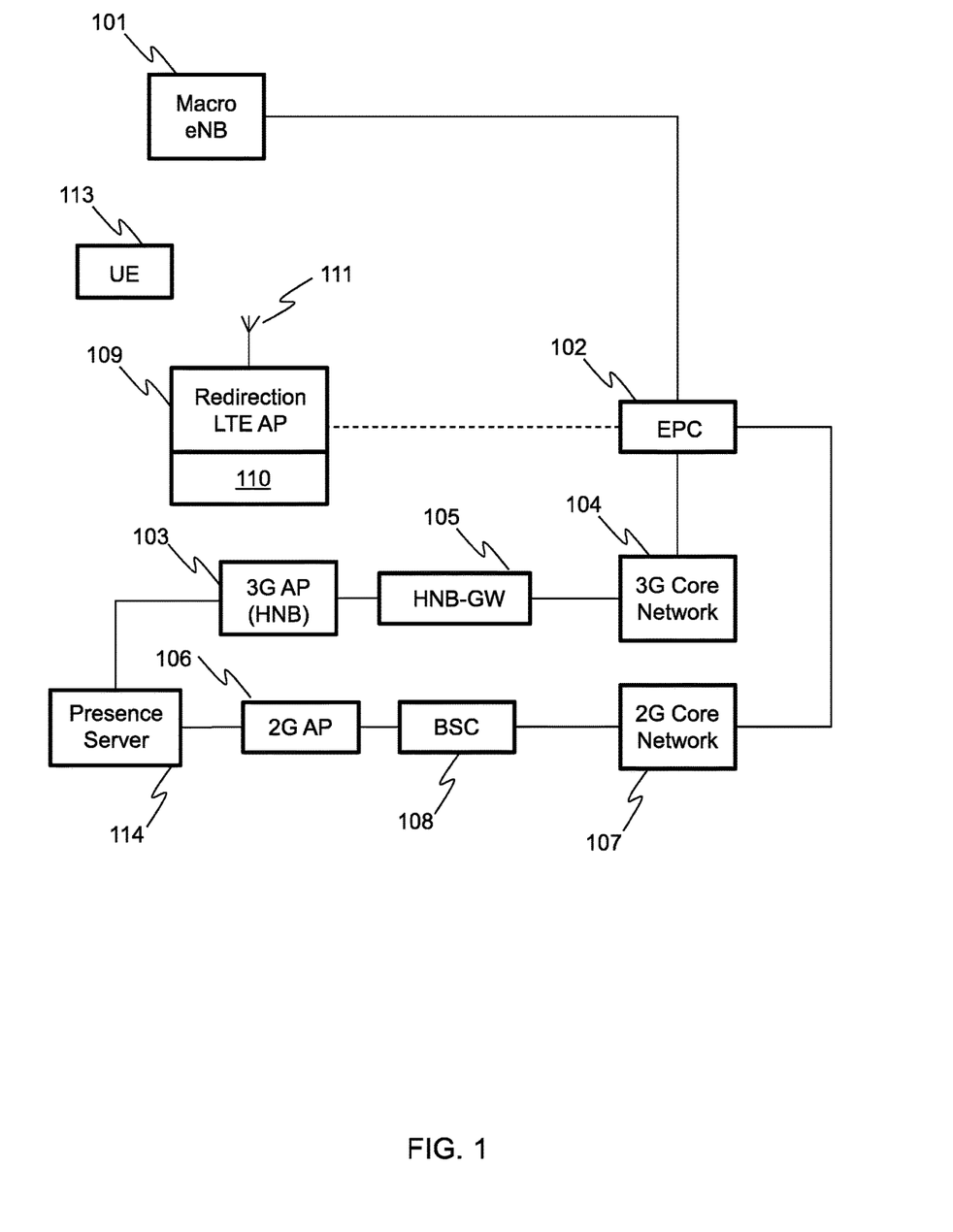
FIG. 1 is a simplified block diagram of a cellular communications system operating in accordance with an embodiment of the invention.

Referring now to FIG. 1, a macro Evolved NodeB (ENodeB or eNodeB or ENB) 101 provides cellular communications services over a respective coverage area and operates using the LTE radio access technology. The macro eNodeB is of conventional design. For example, the eNodeB may, typically, contain information about neighbouring cells such as the operating frequencies and/or identities. The eNodeB is also provisioned with a Tracking Area Code (TAC) which is a number configured into the eNodeB to denote a particular tracking area (TA). The eNode B is connected to and communicates with an Evolved Packet Core (EPC) 102 in a conventional manner. The Evolved Packet Core 102 is also conventional and may comprise, for example, a Serving Gateway a Packet Gateway and a Mobility Management Entity (not shown).

A 3G access point.(3G AP)103, which in this example is a Home Node B (HNB), provides cellular communications services over a respective coverage area and operates using the 3G radio access technology. In other examples, in place of the Home Node B the 3G access point could be a node B having a typically greater coverage area compared with the HNB. The 3G access point 103 in some embodiments can communicate with a 3G core network 104 in a conventional manner via a Home Node B Gateway (HNB-GW) 105. In this example, the 3G core network 104 communicates with the Evolved Packet Core 102.

A 2G access point 106 provides cellular communications services over a respective coverage area and operates using the 2G radio access technology. The 2G access point 106 in some embodiments can communicate with a 2G core network 107 in a conventional manner via a Base Station Controller (BSC) 108. The 2G access point 106 may comprise a base station transceiver. In this example, the 2G core network 107 communicates with the Evolved Packet Core 102.

In alternative embodiments, either one or both of the 2G and 3G access points 106, 103 could be isolated cells, not actually connected to a core network but merely configured to determine an identity (for example the IMSI) of the user equipment (for the purpose of achieving a presence service for example) and then to redirect the UE back to another cell which is connected with the core network.

A "redirection" LTE access point (LTE AP) 109 provides cellular communication services over a respective coverage area which overlaps at least part of the coverage areas of the macro eNodeB 101, the 3G access point 103 and the 2G access point 106. In one example, the LTE access point 109 is an evolved Home Node B serving a small coverage area and may be deployed in locations where a presence service is desired; such as a shopping mall for example. Hence in this example, the LTE access point's cell sits underneath the macrocells which are served by the macro eNodeB 101, the 3G HNB 103 and the 2G access point 106. In other embodiments, the LTE access point 109 may be a Node B with a larger coverage area. The LTE access point 109 is provisioned with a TAC which is different from that of the macro eNodeB. The LTE access point 109 includes a memory 110 which stores information relating to neighbouring cells. In particular, such information relates to the 3G HNB 103, and the 2G access point 106 and may include, for example their operating frequencies and an identifier. The memory 110 may be provisioned with this information under the control of a conventional access management system (not shown). In another embodiment, the LTE access point 109 is provided with a network listen device 111 which listens to broadcasts from neighbouring cells, collects information relating to the neighbouring cells from the broadcast information and stores it in the memory 110. Specifically, the network listen device 111 monitors broadcasts from the 3G and 2G access points 103 and 106 respectively.

In one embodiment, the LTE access point 109 is connected to and communicates with the EPC 102 in a conventional fashion over a link 112. In this case the LTE access point 109 is able to provide the usual communication services to a user equipment which may enter its coverage area in addition to performing an immediate redirection operation on another UE. In another embodiment, the LTE access point 109 is not used to provide any communication services via the EPC 102 and so no connection is provided and in this configuration, the LTE access point 109 performs a redirection operation only. The LTE access point 109 is arranged to receive messages from a user equipment 113, and generate redirection messages for sending to selected user equipments. A remote presence server 114 is connected to the 3G access point 103 and to the 2G access point 106.

Examples of operation of the invention will now be described. An LTE access point 109 is deployed in an area where it is desired to have a policy override such that a UE 113 which is 'camped on' to a LTE macrocell may be reselected on to the LTE Access Point with specific policy, and will in turn be redirected to a 3G or 2G cell, 103 or 106 whether or not the service provided by the 3G or 2G cell is superior to that provided by the LTE cell. The LTE access point is also deployed in an area where a presence detection of user equipments is required. The LTE access point has a different TAC to the LTE macrocell. This will prompt a TAU (Tracking Area Update) procedure by the UE on reselection. In this example, the LTE access point 109 does not communicate with the EPC 102 and is used solely for redirection purposes.

Figure 2:
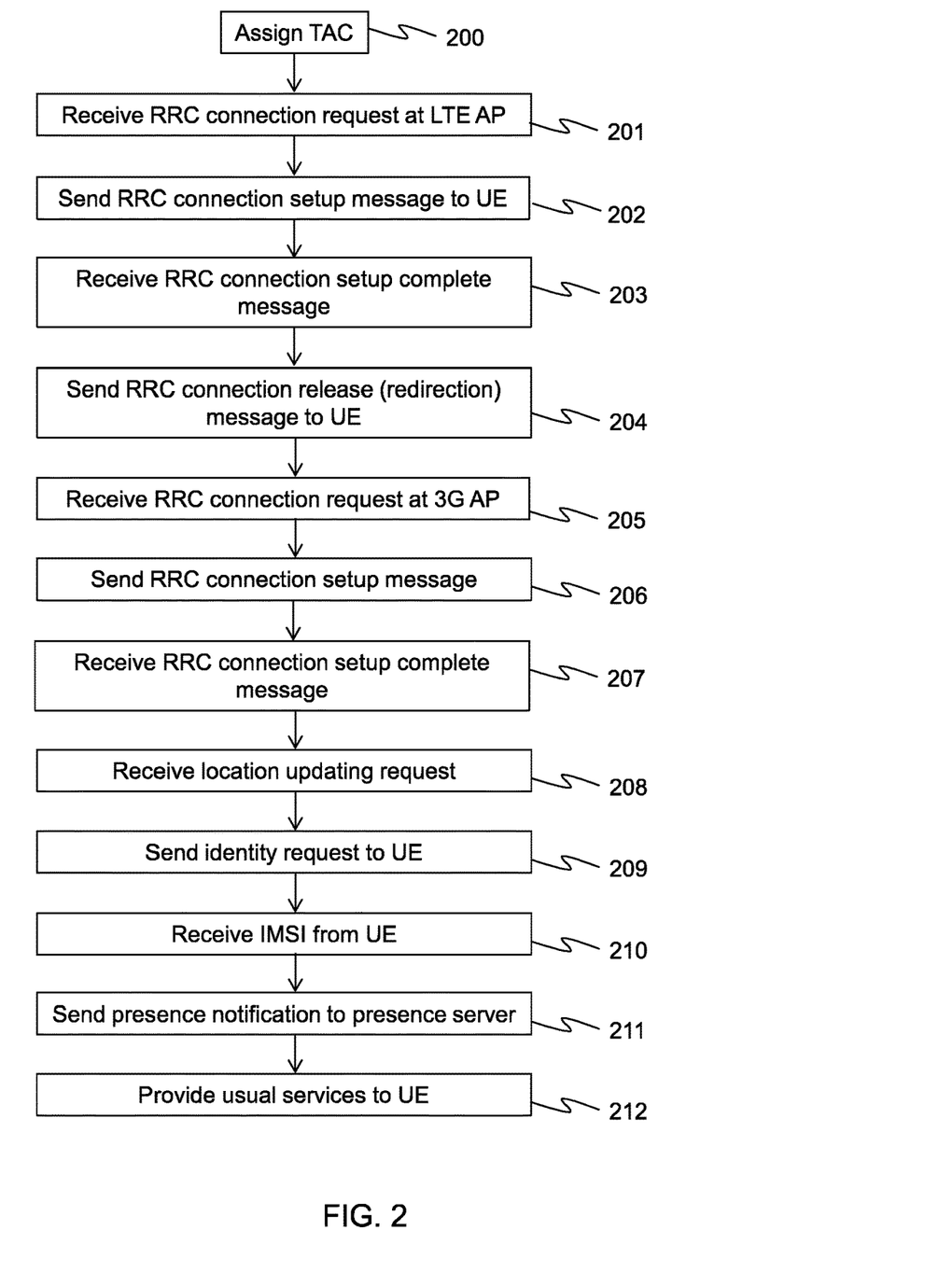
FIG. 2 is a simplified flowchart chart of an example of a method for redirecting a wireless communication unit between cells using different radio access technologies and performing a presence service, in accordance with an embodiment of the invention.

Referring now to FIG. 2, at 200, a TAC, which is different from that of the LTE macrocell, is assigned to the cell supported by the LTE access point 109. A UE 113 is "camped on" to the macrocell served by eNodeB 101. That is to say that the UE 113 is in idle mode and has registered with the LTE marcocell. The UE 113 moves into the coverage area of the (redirection) LTE access point 109. As is conventional, the UE takes measurements of neighbouring cells and according to the conventional policies, identifies the LTE access point 109 as a suitable candidate for 'reselection,' because, for example, the LTE access point's broadcast signal strength (or quality) is better than that of the macro eNodeB 101. The UE, following conventional procedures, also detects that the LTE access point 109 has a different TAC to the macro eNodeB. So, in accordance with the macro policy, the UE reselects to the LTE access point 109 and initiates an RRC (Radio Resource Control) Connection Request with the intention of performing a TAU (Tracking Area Update). Thus, at 201, the LTE AP 109 receives the RRC Connection Request.

The LTE AP 109 accepts the RRC Connection Request and at 202 responds by sending to the UE an RRC Connection Setup message. In response, the UE sends an RRC Connection Setup Complete message which is received by the LTE AP at 203. The LTE access point 109 does not pass any NAS (non-access stratum) messages towards the Core Network but instead, immediately initiates a redirection to the 3G cell 103 by releasing the RRC Connection (RRC Connection Release) at 204. Alternatively, the LTE access point 109 may choose to redirect the UE to the 2G cell 106.

The RRC Connection Release message which is sent to the UE by the LTE access point 109 includes an RRC redirection IE (Information Element). In this way, the UE receives information about the 3G (or 2G) neighbouring cell, this information having been retrieved from the access point's memory 110. The RRC redirection IE includes redirectedCarrierInfo (and idleModeMobilityControlInfo); and optionally cellInfoList-r9. "redirectedCarrierInfo" can specify the carrier of the target 2G/3G cell. "idleModeMobilityControlInfo" can be used to reinforce that the wanted target cell carrier is highest priority. "cellInfoList-r9" can save time when reselecting to the 3G cell by providing SysInfo for immediate use.

The UE then reselects the 3G cell (served by 3G AP 103) and UE sends an RRC Connection Request which is received by the 3G access point 103 at 205. In response, at 206, the 3G access point 103 sends an RRC Connection Setup message to the UE 113. In response, the UE sends an RRC Connection Setup Complete message which is received by the 3G access point 103 at 207. This is followed by a RRC Initial Direct Transfer (Location Updating Request) which is received by the 3G access point 103 at 208.

Now that the UE has initiated communication with the 3G cell, the 3G radio access network can use established techniques to recover the identity of the UE 113 for presence service purposes. So at 209, the 3G AP 103 requests the unique identity of the UE by sending an RRC Downlink Direct Transfer (Mobility Management Identity Request).

The UE responds with an RRC Uplink Direct Transfer (Mobility Management Identity Response) message which includes the IMSI. This is received by the 3G AP at 210.

At 211, the 3G AP 103 generates a presence notification message and forwards it to the presence server 114. The notification message includes the IMSI, which has been captured by the 3G AP 103, and also information which relates to the LTE AP 109 so that the presence server 114 can link the received IMSI with a geographical location. If the LTE AP 109 and the 3G AP 103 are co-located, then information relating to the 3G AP 103 could be sent instead. The 3G AP 103 or the presence server 114 may time-stamp the presence notification message.

At 212, in this example, the 3G AP 103 continues to operate as conventional by supplying normal communications services to the UE 113 by way of its links to the 3G core network 104 through the HNB Gateway 105.

In alternative embodiments the HNB Gateway 105 (or other entity), rather than the 3G AP 103, generates and sends the presence notification. For example, the 3G AP 103 sends the received IMSI to the HNB Gateway 105 using standard messaging such as HNBAP (Home Node B Application Part) UE Register Request. An identifier relating to the location of the LTE AP 109 (or 3G AP 103 if the two are co-located) may be sent by the 3G AP 103 to the HNB Gateway 105 or the HNB Gateway may be pre-provisioned with such information. Then, the HNB Gateway 105 generates and sends a presence notification message to the presence server 114.

In other environments, the 3G access point 103 may reject the UE 113 after receiving the IMSI. This may be done in the 3G AP 103 by generating a Downlink Transfer (Location Updating Reject with cause) to the UE 113. In another embodiment, the 3G AP 103, after receiving the IMSI, may re-direct the UE to a neighbouring cell such as the LTE macrocell by generating an RRC Connection Release message with relevant information about the LTE macrocell.

The signal processing functionality of the embodiments of the invention, particularly those functions performed by the of the access points may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A first access point for providing communications in a first cell using a first radio access technology, RAT, wherein the first cell has a coverage area that overlaps at least a part of a coverage area of a second cell that uses a same first RAT as that of the first cell, and at least a part of a coverage area of a third cell that uses a second RAT that is different from the first RAT of the first and second cells, wherein the first access point comprises:
   a first tracking area code, TAC, that is configured to be different from a second TAC assigned to the second cell such that multiple TACs are used within the same RAT, and the first TAC and second TAC are different to a third Area Code assigned to the third cell that uses the second RAT that is a different RAT to the first RAT;
   a memory for storing information relating to the third cell, and
   wherein the first access point is arranged to receive and capture a request for connection to an access point of the second cell from a wireless communication unit that is within the overlapping coverage area of the first cell as the first access point is using the same first RAT as the second cell that the wireless communication unit is registered with, and in response to capturing said request for connection, the first access point is arranged to establish a connection and redirect the wireless communication unit to the third cell that uses the second RAT by sending to the wireless communication unit, a Radio Resource Control Connection Release message including a Radio Resource Control redirection Information Element that includes the stored information relating to the third cell that enables the wireless communication unit to autonomously establish a RRC connection with the third cell.

2. A second access point for providing communications services in said third cell and that overlaps at least a part of a coverage area provided by the first access point of claim 1, the second access point arranged to receive a request for connection from the wireless communication unit that has been re-directed thereto by the first access point, and further arranged to request from the wireless communication unit, an identifier relating to the wireless communication unit, to receive said identifier from the wireless communication unit and to generate a presence notification message including said identifier and forward said presence notification message to a remote entity.

3. The second access point according to claim 2, further arranged to accept the request for connection from the wireless communication unit and provide communications services to the wireless communication unit via a core network.

4. The second access point according to claim 2, further arranged to reject the request for connection from the wireless communication unit after receiving the identifier.

5. The second access point according to claim 4, further arranged to re-direct the wireless communication unit to a neighbouring cell after receiving the identifier.

6. The first access point according to claim 1, wherein the first RAT used by the first and second cells is a Long Term Evolution radio access technology and the second RAT used by the third cell is a 3G radio access technology or a 2G radio access technology.

7. The first access point according to claim 1, wherein the first access point includes a network listen device for receiving information relating to the third cell, broadcast by the third cell, for storage in the memory.

8. The second access point according to claim 2, wherein the identifier is an International Mobile Subscriber Identity, IMSI.

9. A communication system comprising:
a first access point for providing communications in a first cell using a radio access technology, RAT, wherein the first cell has a coverage area that overlaps at least a part of a coverage area of a second cell that uses a same first RAT as that of the first cell, and at least a part of a coverage area of a third cell that uses a second RAT that is different from the first RAT of the first and second cells, wherein the first access point comprises:
a first tracking area code, TAC, that is configured to be different from a second TAC assigned to the second cell such that multiple TACs are used within the same RAT, and where the first TAC and second TAC are different to a third Area Code assigned to the third cell that uses a second RAT that is a different RAT to the first RAT;
a memory for storing information relating to the third cell, and a signal processor, arranged to receive and capture a request for connection to an access point of the second cell from a wireless communication unit that is within the overlapping coverage area of the first cell as the first access point is using the same first RAT as the second cell that the wireless communication unit is registered with, and in response to capturing said request for connection, the first access point is arranged to establish a connection and redirect the wireless communication unit to the third cell that uses the second RAT by sending a Radio Resource Control Connection Release message including a Radio Resource Control redirection Information Element to the wireless communication unit that includes the stored information relating to the third cell that enables the wireless communication unit to autonomously establish a RRC connection with the third cell;
a second access point for providing communications services in said third cell, the second access point comprising:
a receiver configured to receive a request for connection from the wireless communication unit that has been re-directed to the third cell by the first access point;
a transmitter configured to request from the wireless communication unit, an identifier relating to the wireless communication unit, wherein the receiver is configured to receive said identifier from the wireless communication unit to achieve a presence service.

10. A method for operating a cellular communication system, the method comprising; in a first access point that provides communications in a first cell using a first radio access technology, RAT, wherein the first cell has a coverage area that overlaps at least a part of the coverage area of a second cell that uses a same first RAT as that of the first cell and at least a part of the coverage area of a third cell that uses a second RAT that is different from that of the first and second cells,
assigning a first tracking area code, TAC, to the first access point that is different from a second TAC assigned to the second cell and the first TAC and second TAC are different to a third Area Code assigned to the third cell that uses the second RAT that is a different RAT to the first RAT,
storing information relating to the third cell,
receiving and capturing a request for connection to an access point of the second cell from a wireless communication unit that is within the overlapping coverage area of the first cell as the first access point is using the same first RAT as the second cell that the wireless communication unit is registered with, and in response to capturing said request for connection,
redirecting the wireless communication unit to the third cell that uses the second RAT by sending to the wireless communication unit, a Radio Resource Control Connection Release message including a Radio Resource Control redirection Information Element that includes the stored information relating to the third cell that enables the wireless communication unit to autonomously establish a RRC connection with the third cell.

11. A method according to claim 10, wherein a second access point is arranged to provide communications services in said third cell, the method further comprising at said second access point:
receiving a request for connection from the wireless communication unit that has been re-directed to the third cell by the first access point, requesting from the wireless communication unit, an identifier relating to the wireless communication unit, and receiving said identifier from the wireless communication unit to enable a presence service for the wireless communication unit.

12. A method according to claim 11, further comprising; at the second access point, accepting the request for connection from the wireless communication unit and providing communications services to the wireless communication unit via a core network.

13. A method according to claim 11, further comprising; at the second access point, rejecting the request for connection from the wireless communication unit after receiving the identifier.

14. A method according to claim 13, further comprising; at the second access point, re-directing the wireless communication unit to a neighbouring cell after receiving the identifier.

15. A method according to claim 11, further comprising; at the second access point generating a presence notification message including said identifier and forwarding said presence notification message to a remote entity.

16. A method according to claim 10, wherein the first RAT used by the first and second cells is a Long Term Evolution radio access technology and the second RAT used by the third cell is a 3G radio access technology or a 2G radio access technology.

17. A method according to claim 10, wherein the first access point includes a network listen device and the method further comprises, at the first access point receiving information relating to the third cell, broadcast by the third cell, for storage in the memory.

18. A method according to claim 11, wherein the identifier is an International Mobile Subscriber Identity, IMSI.

* * * * *